United States Patent
Ohashi et al.

[11] Patent Number: 6,101,999
[45] Date of Patent: Aug. 15, 2000

[54] COMPRESSION IGNITION TYPE ENGINE

[75] Inventors: Nobumoto Ohashi, Susono; Toshiaki Tanaka, Numazu; Eiji Iwasaki; Shinya Hirota, both of Susono; Kouji Yoshizaki, Numazu; Kazuhiro Itoh, Mishima, all of Japan

[73] Assignee: Toyota Jidosha Kabushiki Kaisha, Toyota, Japan

[21] Appl. No.: 09/276,816

[22] Filed: Mar. 26, 1999

[30] Foreign Application Priority Data

Mar. 30, 1998 [JP] Japan .................................. 10-083748

[51] Int. Cl.$^7$ ............................ F02B 17/00; F02M 25/07
[52] U.S. Cl. ........................ 123/295; 123/568.21; 60/278
[58] Field of Search ..................... 123/295, 305, 123/568.11, 568.21; 60/278, 285, 299, 300, 301, 298

[56] References Cited

U.S. PATENT DOCUMENTS

| | | | |
|---|---|---|---|
| 4,142,493 | 3/1979 | Schira et al. | 123/568.21 |
| 4,454,854 | 6/1984 | Gotoh et al. | 123/568.27 |
| 5,172,550 | 12/1992 | Takeshima | 60/278 |
| 5,482,020 | 1/1996 | Shimizu et al. | 123/406.47 |
| 5,632,144 | 5/1997 | Isobe | 60/277 |
| 5,732,554 | 3/1998 | Sasaki et al. | 60/278 |
| 5,743,243 | 4/1998 | Yanagihara | 123/305 |
| 5,826,559 | 10/1998 | Ichimoto et al. | 123/295 |
| 5,848,580 | 12/1998 | Mashiki | 123/295 |
| 5,890,360 | 4/1999 | Sasaki et al. | 60/278 |
| 5,937,639 | 8/1999 | Sasaki et al. | 60/278 |
| 5,950,594 | 9/1999 | Mizuno | 123/295 |
| 5,960,765 | 10/1999 | Iida et al. | 123/295 |
| 5,964,199 | 10/1999 | Atago et al. | 123/305 |
| 5,975,045 | 11/1999 | Mizuno | 123/295 |
| 5,979,396 | 11/1999 | Yasuoka | 123/295 |
| 5,979,397 | 11/1999 | Machida et al. | 123/295 |
| 5,996,547 | 12/1999 | Machida et al. | 123/295 |
| 6,024,069 | 2/2000 | Yoshino | 123/295 |

FOREIGN PATENT DOCUMENTS

| | | |
|---|---|---|
| 4-334750 | 11/1992 | Japan . |
| 6-346763 | 12/1994 | Japan . |
| 7-4287 | 1/1995 | Japan . |

OTHER PUBLICATIONS

Sato et al., "A Simultaneous Reduction of $NO_x$ and Soot in Diesel Engines Under a New Combustion System", Paper No. 205, Spring Symposium 1996, held by Society of Automotive Engineers of Japan, pp. 81–84.

Primary Examiner—Willis R. Wolfe
Attorney, Agent, or Firm—Oliff & Berridge, PLC

[57] ABSTRACT

A compression ignition type engine, wherein a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks are selectively switched between and wherein the air-fuel ratio is temporarily made rich immediately before switching from the first combustion to the second combustion or immediately after switching from the second combustion to the first combustion.

8 Claims, 17 Drawing Sheets

Fig. 4
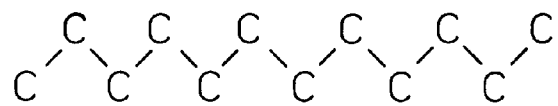
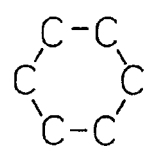 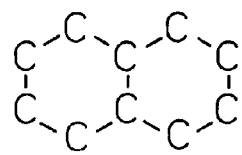
Fig. 5
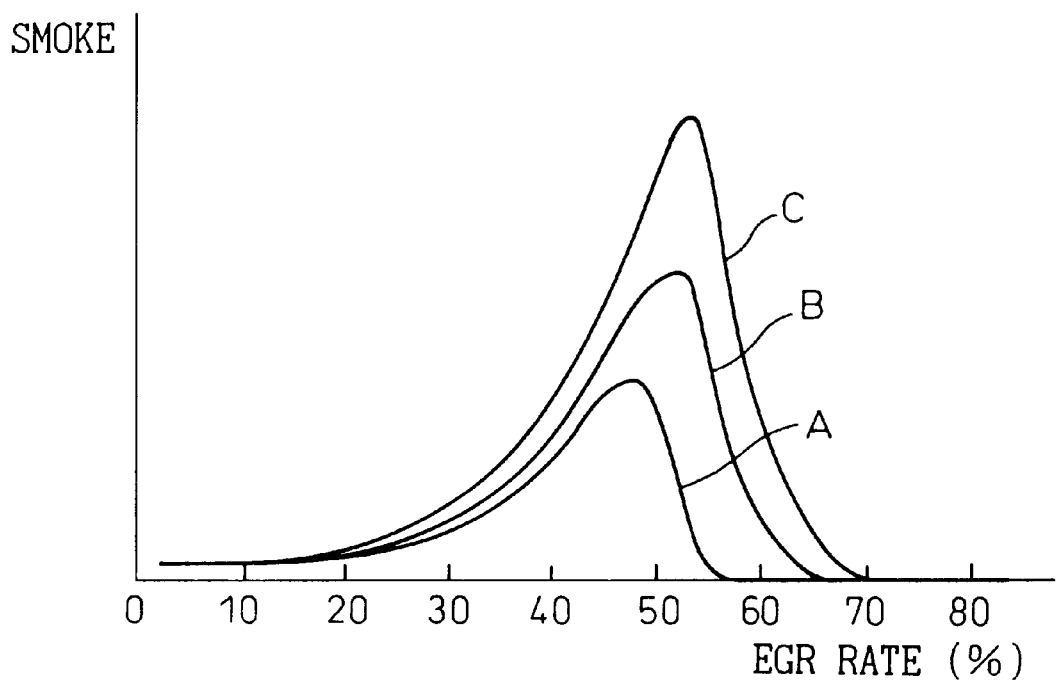

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas+amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit (for example, see Japanese Unexamined Patent Publication (Kokai) No. 4-334750). The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx and smoke produced would become as small as possible within a range not exceeding that maximum allowable limit. Even if the EGR rate is set in this way so that the amount of NOx and smoke produced becomes as small as possible, however, there are limits to the reduction of the amount of production of NOx and smoke. In practice, therefore, a considerable amount of NO and smoke continues being produced.

The present inventors, however, discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the amount of production of smoke will become almost zero, that is, almost no soot will be produced. Further, they found that the amount of NOx produced at this time was extremely small. They engaged in further studies later based on this discovery to determine the reasons why soot was not produced and as a result constructed a new system of combustion able to simultaneously reduce the soot and NOx more than ever before. This new system of combustion will be explained in detail later, but briefly it is based on the idea of stopping the growth of hydrocarbons into soot at a stage before the hydrocarbons grow.

That is, what was found from repeated experiments and research was that the growth of hydrocarbons into soot stops at a stage before that happens when the temperatures of the fuel and the gas around the fuel at the time of combustion in the combustion chamber are lower than a certain temperature and the hydrocarbons grow to soot all at once when the temperatures of the fuel and the gas around the fuel become higher than a certain temperature. In this case, the temperatures of the fuel and the gas around the fuel are greatly affected by the heat absorbing action of the gas around the fuel at the time of combustion of the fuel. By adjusting the amount of heat absorbed by the gas around the fuel in accordance with the amount of heat generated at the time of combustion of the fuel, it is possible to control the temperatures of the fuel and the gas around the fuel.

Therefore, if the temperatures of the fuel and the gas around the fuel at the time of combustion in the combustion chamber are suppressed to less than the temperature at which the growth of the hydrocarbons stops midway, soot is no longer produced. The temperatures of the fuel and the gas around the fuel at the time of combustion in the combustion chamber can be suppressed to less than the temperature at which the growth of the hydrocarbons stops midway by adjusting the amount of heat absorbed by the gas around the fuel. On the other hand, the hydrocarbons stopped in growth midway before becoming soot can be easily removed by after-treatment using an oxidation catalyst etc. This is the basic thinking behind this new system of combustion.

In this new method of combustion, however, while soot is not produced as explained above, hydrocarbons are exhausted, so it is necessary to place a catalyst having an oxidation action etc. in the engine exhaust passage to remove the hydrocarbons. A catalyst having an oxidation action etc., however, normally carries platinum or another precious metal. The precious metal is gradually made to oxidize if the precious metal is continuously exposed to an oxygen rich state. If the precious metal is made to oxidize, the activity of the catalyst, that is, the oxidation action, will decline and accordingly the action in removing the hydrocarbons will gradually decline.

In this case, however, it is possible to restore the activity of the catalyst by making the temperature of the catalyst bed higher and making the air-fuel ratio rich. That is, if the air-fuel ratio is made rich in the state of a low catalyst bed temperature, the unburned hydrocarbons will cover the surface of the precious metal and therefore in this case the activity of the catalyst will end up declining. As opposed to this, if the air-fuel ratio is made rich in the state of a high catalyst bed temperature, the oxygen bonded to the precious metal will be used for oxidizing action of the unburned hydrocarbons and as a result the precious metal will be reduced and accordingly the activity of the catalyst will be restored.

In this way, it is possible to restore the activity of the catalyst by making the temperature of the catalyst bed high and making the air-fuel ratio rich. In a conventional diesel engine, however, if the air-fuel ratio is made rich, a large amount of soot is produced. Therefore, it is not possible to make the air-fuel ratio rich in a conventional diesel engine. As opposed to this, in the new method of combustion explained above, as will be discussed later, almost no soot is produced even if the temperature of the catalyst bed becomes high and the air-fuel ratio is made rich. That is, under the new method of combustion, it is easy to create an operating state where the temperature of the catalyst bed is high and the air-fuel ratio is rich.

SUMMARY OF THE INVENTION

An object of the present invention is to provide a compression ignition type engine designed to prevent a decline in the activity of a catalyst carrying a precious metal by using this new method of combustion.

According to the present invention, there is provided a compression ignition type engine in which an amount of production of soot gradually increases and then peaks when an amount of inert gas supplied in a combustion chamber increases and in which a further increase of the amount of inert gas supplied in the combustion chamber results in a temperature of fuel and surrounding gas in the combustion chamber becoming lower than a temperature of production of soot and therefore almost no production of soot any longer, said engine comprising: a catalyst arranged in an engine exhaust passage and carrying a precious metal; switching means for selectively switching between a first combustion where the amount of the inert gas supplied to the combustion chamber is larger than the amount of inert gas where the amount of production of soot peaks and almost no soot is produced and a second combustion where the amount of inert gas supplied to the combustion chamber is smaller than the amount of inert gas where the amount of production of soot peaks; and air-fuel ratio control means for making an air-fuel ratio at least temporarily rich under the first combustion when switching from the first combustion to second combustion or switching from the second combustion to the first combustion.

BRIEF DESCRIPTION OF THE DRAWINGS

The present invention may be more fully understood from the description of the preferred embodiments of the invention set forth below together with the accompanying drawings, in which:

FIG. 4 is a view of a fuel molecule;

FIG. 5 is a view of the relationship between the amount of smoke produced and the EGR rate;

DESCRIPTION OF THE PREFERRED EMBODIMENTS

Figure 1:
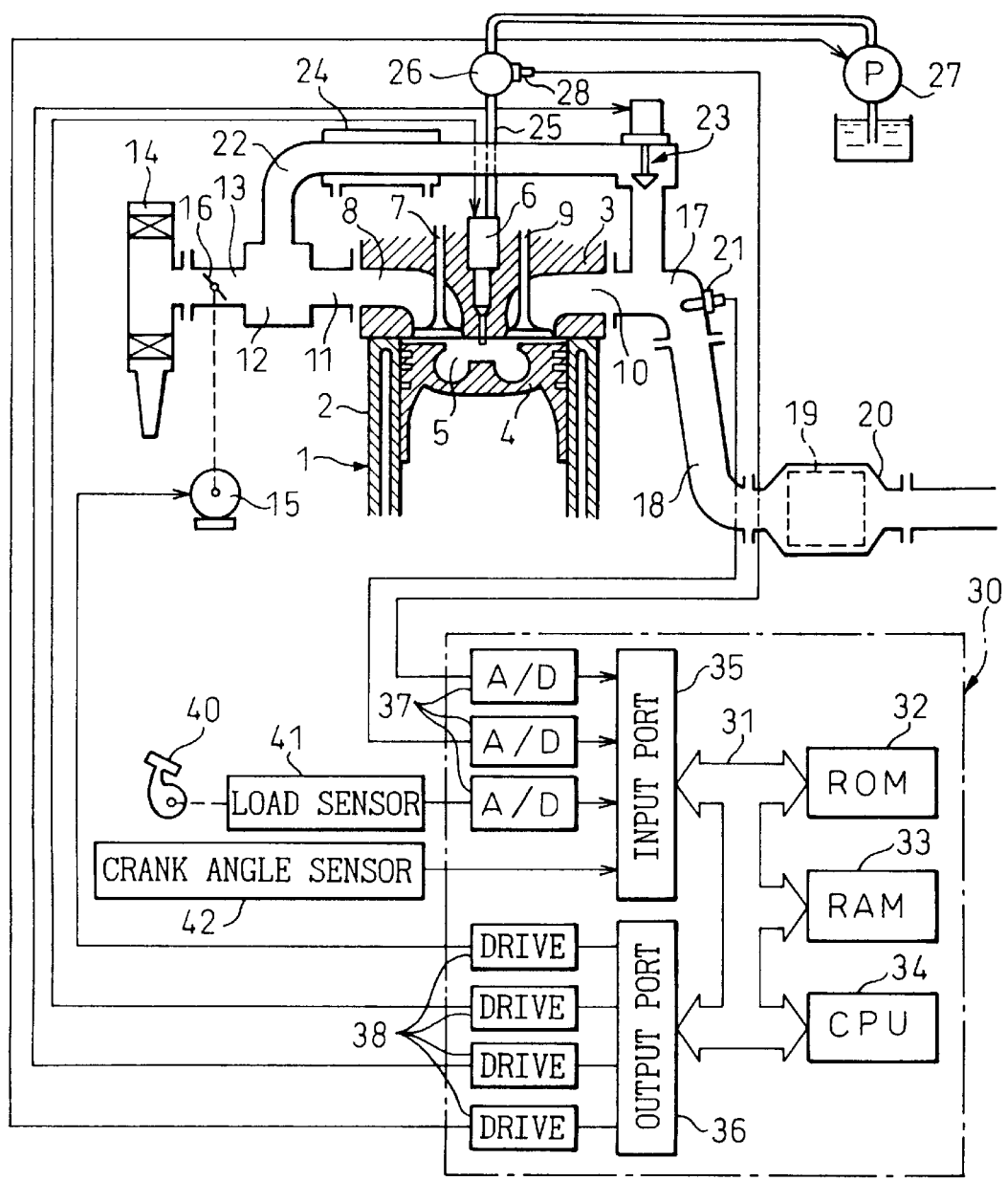
FIG. 1 is an overall view of a compression ignition type engine.

FIG. 1 is a view of the case of application of the present invention to a four-stroke compression ignition type engine. Referring to FIG. 1, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 to an air cleaner 14. A throttle valve 16 driven by an electric motor 15 is arranged in the intake duct 13. On the other hand, the exhaust port 10 is connected through an exhaust manifold 17 and exhaust tube 18 to a catalytic converter 20 housing a catalyst 19 having an oxidation action. An air-fuel ratio sensor 21 is arranged in the exhaust manifold 17.

The exhaust manifold 17 and surge tank 12 are connected with each other through an EGR passage 22. An electrically controlled EGR control valve 23 is arranged in an EGR passage 22. Further, a cooling apparatus 24 for cooling the EGR gas flowing through the EGR passage 22 is provided around the EGR passage 22. In the embodiment shown in FIG. 1, the engine cooling water is guided to the cooling apparatus 24 where the engine cooling water is used to cool the EGR gas.

On the other hand, each fuel injector 6 is connected through a fuel supply tube 25 to the fuel reservoir, that is, a common rail 26. Fuel is supplied to the common rail 26 from an electrically controlled variable discharge fuel pump 27. Fuel supplied in the common rail 26 is supplied through each fuel supply tube 25 to the fuel injectors 6. A fuel pressure sensor 28 for detecting the fuel pressure in the common rail 26 is attached to the common rail 26. The amount of discharge of the fuel pump 27 is controlled based on the output signal of the fuel pressure sensor 28 so that the fuel pressure in the common rail 26 becomes the target fuel pressure.

The electronic control unit 30 is comprised of a digital computer and is provided with a ROM (read only memory) 32, a RAM (random access memory) 33, a CPU (microprocessor) 34, a backup RAM 33a connected to a constant power source, an input port 35, and an output port 36 connected with each other by a bidirectional bus 31. The output signal of the air-fuel ratio sensor 21 is input through a corresponding AD converter 37 to the input port 35. Further, the output signal of the fuel pressure sensor 28 is input through a corresponding AD converter 37 to the input port 35. The accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 for generating an output pulse each time the crankshaft rotates by for example 30°. On the other hand, the output port 36 has connected to it through a corresponding drive circuit 38 the fuel injector 6, electric motor 15, EGR control valve 23, and fuel pump 27.

Figure 2:
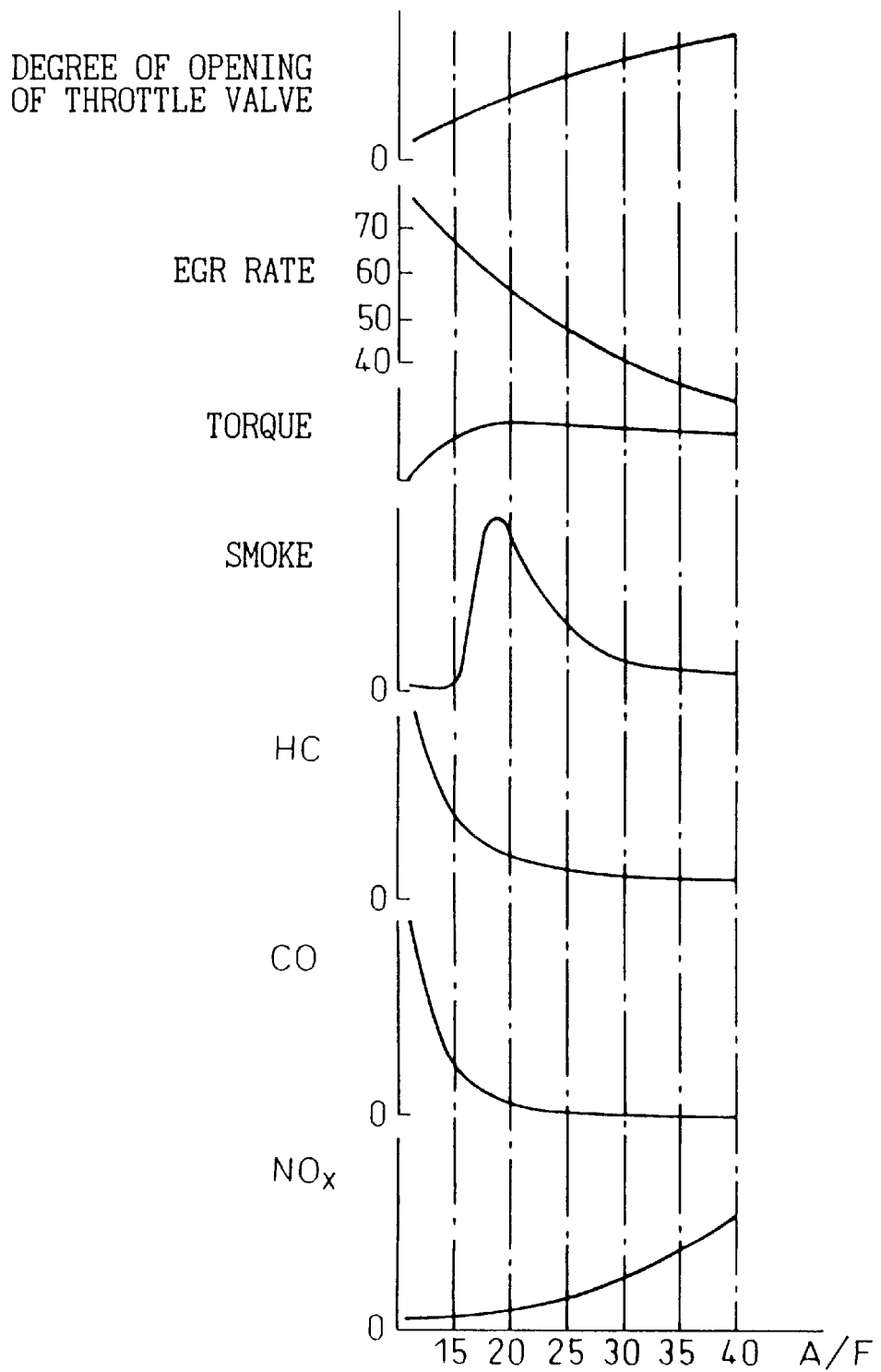
FIG. 2 is a view of the amount of generation of smoke and NOx.

FIG. 2 shows an example of an experiment showing the changes in the output torque and the changes in the amount of smoke, HC, CO, and NOx exhausted when changing the air-fuel ratio A/F (abscissa in FIG. 2) by changing the opening degree of the throttle valve 16 and the EGR rate at the time of engine low load operation. As will be understood from FIG. 2, in this experiment, the EGR rate becomes larger the smaller the air-fuel ratio A/F. When below the stoichiometric air-fuel ratio (≈14.6), the EGR rate becomes over 65 percent.

As shown in FIG. 2, if increasing the EGR rate to reduce the air-fuel ratio A/F, when the EGR rate becomes close to 40 percent and the air-fuel ratio A/F becomes 30 degrees, the amount of smoke produced starts to increase. Next, when the EGR rate is further raised and the air-fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air-fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 3A:
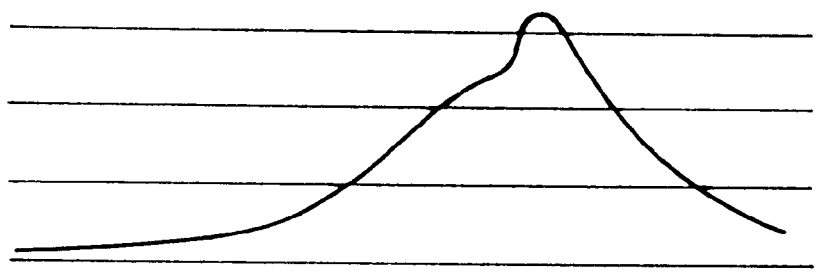
FIGS. 3A and 3B are views of the combustion pressure.
Figure 3B:
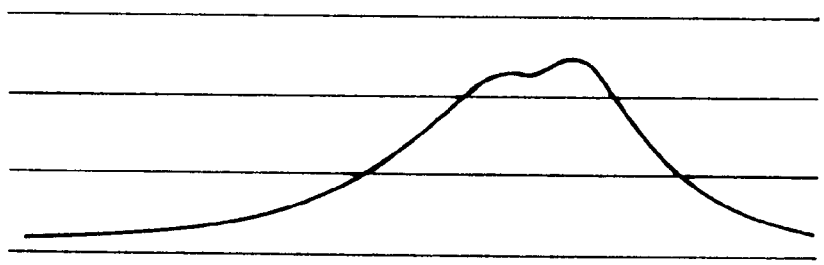

FIG. 3A shows the changes in compression pressure in the combustion chamber 5 when the amount of smoke produced is the greatest near an air-fuel ratio A/F of 21. FIG. 3B shows the changes in compression pressure in the combustion chamber 5 when the amount of smoke produced is substantially zero near an air-fuel ratio A/F of 18. As will be understood from a comparison of FIG. 3A and FIG. 3B, the combustion pressure is lower in the case shown in FIG. 3B where the amount of smoke produced is substantially zero than the case shown in FIG. 3A where the amount of smoke produced is large.

The following may be said from the results of the experiment shown in FIG. 2 and FIGS. 3A and 3B. That is, first, when the air-fuel ratio A/F is less than 15.0 and the amount of smoke produced is substantially zero, the amount of NOx produced falls considerably as shown in FIG. 2. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 3A and 3B. That is, in the state shown in FIG. 3B where almost no soot is produced, the combustion pressure becomes lower, therefore the combustion temperature in the combustion chamber 5 becomes lower at this time.

Second, when the amount of smoke produced, that is, the amount of soot produced, becomes substantially zero, as shown in FIG. 2, the amounts of HC and CO exhausted increase. This means that the hydrocarbons are exhausted without growing into soot. That is, the straight chain hydrocarbons and aromatic hydrocarbons contained in the fuel and shown in FIG. 4 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 4 grow to soot through the soot precursor. Therefore, as explained above, when the amount of production of soot becomes substantially zero, the amount of exhaust of HC and CO increases as shown in FIG. 2, but the HC at this time is a soot precursor or a state of hydrocarbons before that.

Summarizing these considerations based on the results of the experiments shown in FIG. 2 and FIGS. 3A and 3B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperatures of the fuel and the gas around the fuel in the combustion chamber 5 are below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperature of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using an oxidation catalyst etc. As opposed to this, a soot precursor or a state of hydrocarbons before this can be easily removed by after-treatment using an oxidation catalyst etc. Considering after-treatment by an oxidation catalyst etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by an oxidation catalyst etc.

Now, to stop the growth of hydrocarbons in the state before the production of soot, it is necessary to suppress the temperatures of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperatures of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

FIG. 5 shows the relationship between the EGR rate and smoke when changing the degree of cooling of the EGR gas using the EGR gas as an inert gas. That is, in FIG. 5, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 5, when force cooling the EGR gas, the amount of soot produced peaks when the EGR rate becomes slightly lower than 50 percent. In this case, almost no soot is produced any longer when the EGR rate is made more than about 55 percent.

On the other hand, as shown by the curve B in FIG. 5, when slightly cooling the EGR gas, the amount of soot produced peaks when the EGR rate becomes slightly higher than 50 percent. In this case, almost no soot is produced any longer when the EGR rate is made more than about 65 percent.

Further, as shown by the curve C in FIG. 5, when not force cooling the EGR gas, the amount of soot produced peaks when the EGR rate is near 55 percent. In this case, almost no soot is produced any longer when the EGR rate is made more than about 70 percent.

Note that FIG. 5 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 6:
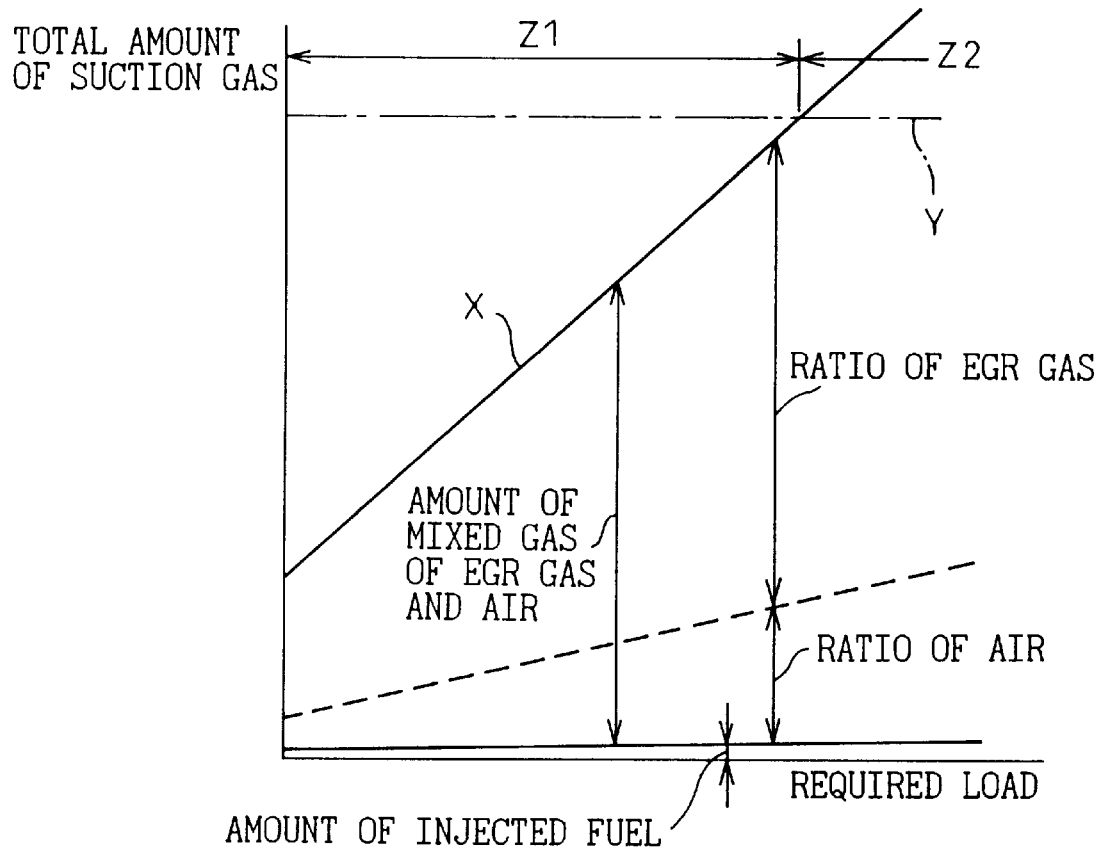
FIG. 6 is a view of the relationship between the amount of injected fuel and the amount of mixed gas.

FIG. 6 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 6, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 6, the ratio of air, that is, the amount of air in the mixed gas, shows the amount of air necessary for causing the injected fuel to completely burn. That is, in the case shown in FIG. 6, the ratio of the amount of air and the amount of injected fuel becomes the stoichiometric air-fuel ratio. On the other hand, in FIG. 6, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent and, in the embodiment shown in FIG. 6, is at least 70 percent. That is, if the total amount of suction gas taken into the combustion chamber 5 is made the solid line X in FIG. 6 and the ratio between the amount of air and amount of EGR gas in the total amount of suction gas X is made the ratio shown in FIG. 6, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 6, the amount of EGR gas has to be increased the greater the amount of injected fuel. That is, the amount of EGR gas has to be increased as the required load becomes higher.

On the other hand, in the load region Z2 of FIG. 6, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air-fuel ratio is rich.

As explained above, FIG. 6 shows the case of combustion of fuel at the stoichiometric air-fuel ratio. In the low load operating region Z1 shown in FIG. 6, even if the amount of air is made smaller than the amount of air shown in FIG. 6, that is, even if the air-fuel ratio is made rich, it is possible to obstruct the production of soot and make the amount of NOx produced around 10 ppm or less. Further, in the low load region Z1 shown in FIG. 6, even if the amount of air is made greater than the amount of air shown in FIG. 6, that is, the average value of the air-fuel ratio is made a lean air-fuel ratio of 17 to 18, it is possible to obstruct the production of soot and make the amount of NOx produced around 10 ppm or less.

That is, when the air-fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the average air-fuel ratio is lean or when the air-fuel ratio is the stoichiometric air-fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air-fuel ratio, that is, whether the air-fuel ratio is rich or the stoichiometric air-fuel ratio or the average air-fuel ratio is lean, no soot is produced and the amount of NOx produced becomes extremely small. Therefore, considering the improvement of the fuel efficiency, it may be said to be preferable to make the average air-fuel ratio lean.

It is however only possible to suppress the temperature of the fuel and the gas surrounding it at the time of combustion in the combustion chamber to less than the temperature where the growth of the hydrocarbons is stopped midway at the time of a relatively low engine load where the amount of heat generated by the combustion is small. Accordingly, in this embodiment of the present invention, when the engine load is relatively low, the temperature of the fuel and the gas surrounding it is suppressed to less than the temperature where the growth of the hydrocarbons stops midway and first combustion, that is, low temperature combustion, is performed. When the engine load is relatively high, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 7A:
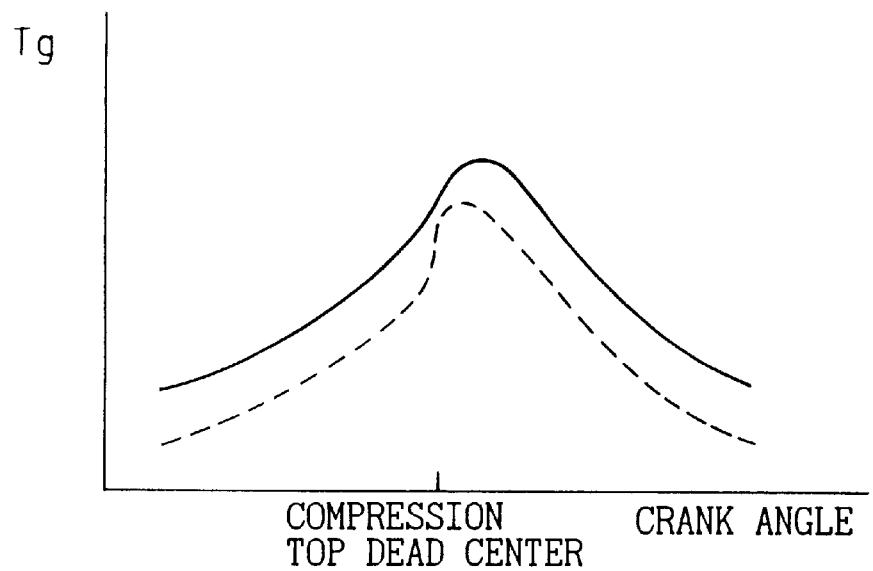
FIGS. 7A and 7B are views of the change in the average gas temperature Tg in the combustion chamber and the temperature Tf of the fuel and the gas around it.
Figure 7B:
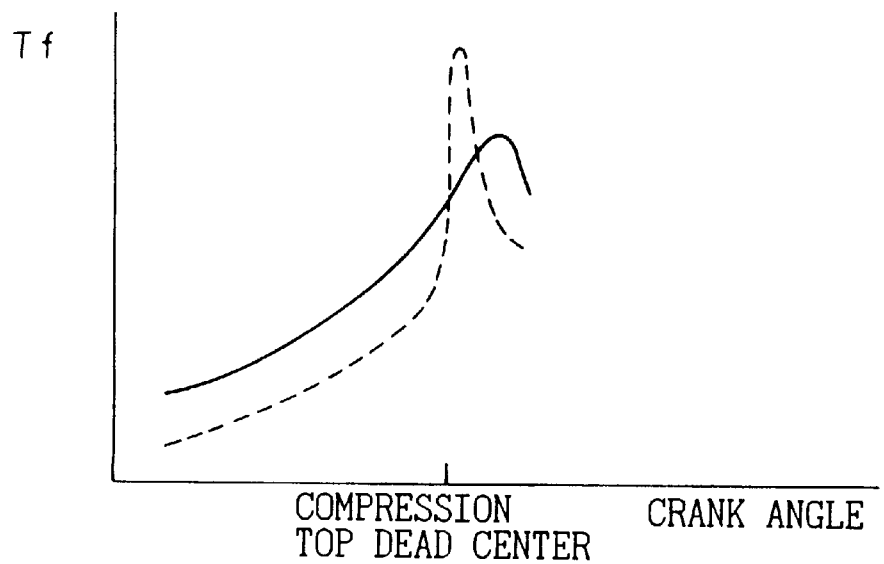

The solid line in FIG. 7A shows the relationship between the average gas temperature Tg in the combustion chamber 5 when the first combustion is performed and the crank angle. The broken line in FIG. 7A shows the relationship between the average gas temperature Tg in the combustion chamber 5 when the second combustion is performed and the crank angle. Further, the solid line in FIG. 7B shows the relationship between the temperature Tf of the fuel and the gas surrounding it when first combustion is being performed and the crank angle. The broken line in FIG. 7B shows the relationship between the temperature Tf of the fuel and the gas surrounding it when the second combustion is being performed and the crank angle.

When the first combustion, that is, the low temperature combustion, is being performed, the amount of EGR gas is larger compared with when the second combustion, that is, the conventional ordinary combustion, is being performed, therefore as shown in FIG. 7A, before top dead center of the compression stroke, that is, during the compression stroke, the average temperature Tg of the gas at the time of the first combustion shown by the solid line becomes higher than the average temperature Tg of the gas at the time of the second combustion shown by the broken line. Note that at this time, as shown by FIG. 7B, the temperature Tf of the fuel and the gas around it becomes substantially the same temperature as the average temperature Tg of the gas.

Next, combustion is started near top dead center of the compression stroke, but in this case, when first combustion is being performed, as shown by the solid line in FIG. 7B, the temperature Tf of the fuel and the gas around it does not become that high. As opposed to this, when second combustion is being performed, as shown by the broken line in FIG. 7B, the temperature Tf of the fuel and the gas around it becomes extremely high. When second combustion is being performed in this way, the temperature Tf of the fuel and the gas around it becomes considerably higher than when the first combustion is being performed, but the temperature of the other gas, constituting the major part, becomes lower when the second combustion is being performed compared with when the first combustion is being performed. Therefore, as shown by FIG. 7A, the average temperature Tg of the gas in the combustion chamber 5 near top dead center of the compression stroke becomes higher when the first combustion is being performed compared with when the second combustion is being performed. As a result, as shown by FIG. 7A, the average temperature Tg of the gas in the combustion chamber 5 after the end of the combustion, that is, in the latter half of the expansion stroke, in other words, the temperature of the burned gas in the combustion chamber 5, becomes higher when the first combustion is being performed compared with when the second combustion is being performed.

When the first combustion, that is, when the low temperature combustion, is being performed, compared with when the second combustion is being performed, the temperature Tf of the fuel and the gas around it at the time of combustion becomes considerably low, but the burned gas in the combustion chamber 5 becomes conversely higher compared with when the second combustion is performed, therefore the temperature of the exhaust gas from the combustion chamber 5 also becomes higher compared with when the second combustion is performed.

Figure 8:
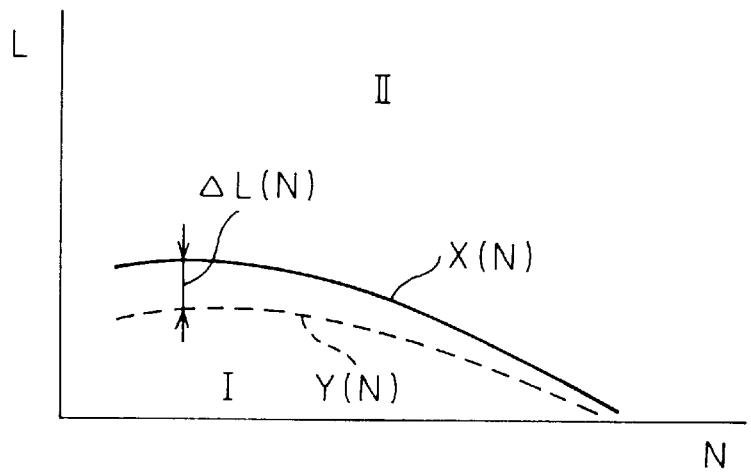
FIG. 8 is a view of a first operating region I and a second operating region II.

FIG. 8 shows a first operating region I where the first combustion, that is, the low temperature combustion, is performed, and a second operating region II where the second combustion, that is, the combustion by the conventional combustion method, is performed. Note that in FIG. 8, the abscissa L shows the amount of depression of the accelerator pedal 40, that is, the required load, and the ordinate N shows the engine speed. Further, in FIG. 8, X(N) shows a first boundary between the first operating region I and the second operating region II, while Y(N) shows a second boundary between the first operating region I and the second operating region II. The change of the operating region from the first operating region I to the second operating region II is judged based on the first boundary X(N), while the change of the operating region from the second boundary region II to the first operating region I is judged based on the second boundary Y(N).

That is, when the engine operating region is the first operating region I and low temperature combustion is being performed, if the required load L exceeds the first boundary X(N), which is a function of the engine rotational speed N, it is judged that the operating region has shifted to the second operating region II and combustion by the conventional combustion method is performed. Next, when the required load L becomes lower than the second boundary Y(N), which is a function of the engine rotational speed N, it is judged that the operating region has shifted to the first operating region I and low temperature combustion again is performed.

Figure 9:
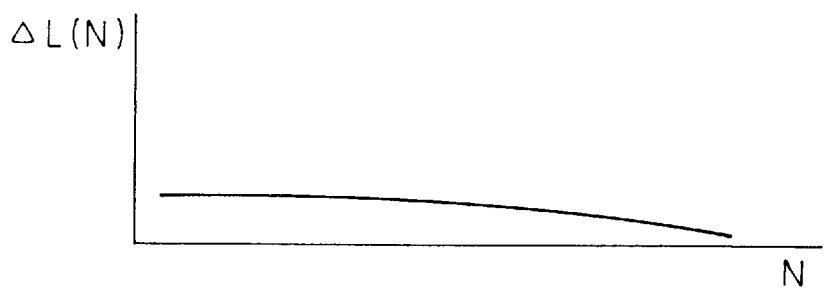
FIG. 9 is a view of the relationship between ΔL(N) and the engine speed N.

Note that in this embodiment of the present invention, the second boundary Y(N) is made the low load side from the first boundary X(N) by ΔL(N). As shown in FIG. 8 and FIG. 9, ΔL(N) is a function of the engine rotational speed N. ΔL(N) becomes smaller the higher the engine speed N.

When low temperature combustion is being performed when the engine is operating in the first operating region I, almost no soot is produced, but instead the unburnt hydrocarbons are exhausted from the combustion chamber 5 in the form of a soot precursor or a state before that. At this time, the unburnt hydrocarbons exhausted from the combustion chamber 5 may be oxidized by the catalyst 19 having the oxidation function.

As the catalyst 19, an oxidation catalyst, three-way catalyst, or NOx absorbent may be used. An NOx absorbent has the function of absorbing the NOx when the average air-fuel ratio in the combustion chamber 5 is lean and releasing the NOx when the average air-fuel ratio in the combustion chamber 5 becomes the stoichiometric air-fuel ratio or rich.

The NOx absorbent is for example comprised of alumina as a carrier and, on the carrier, for example, at least one of potassium K, sodium Na, lithium Li, cesium Cs, and other alkali metals, barium Ba, calcium Ca, and other alkali earths, lanthanum La, yttrium Y, and other rare earths plus platinum Pt or another precious metal is carried.

The oxidation catalyst, of course, and also the three-way catalyst and NOx absorbent have an oxidation function, therefore the three-way catalyst and NOx absorbent can be used as the catalyst 19 as explained above.

Figure 10:
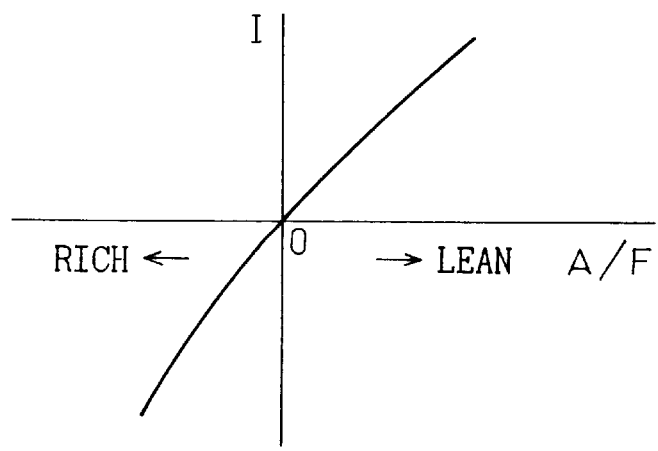
FIG. 10 is a view of the output of the air-fuel ratio sensor.

FIG. 10 shows the output of the air-fuel ratio sensor 21. As shown in FIG. 10, the output current I of the air-fuel ratio sensor 21 changes in accordance with the air-fuel ratio A/F. Therefore, it is possible to determine the air-fuel ratio from the output current I of the air-fuel ratio sensor 21.

The control of the operation in the first operating region I and the second operating region II will be explained next with reference to FIG. 11.

Figure 11:
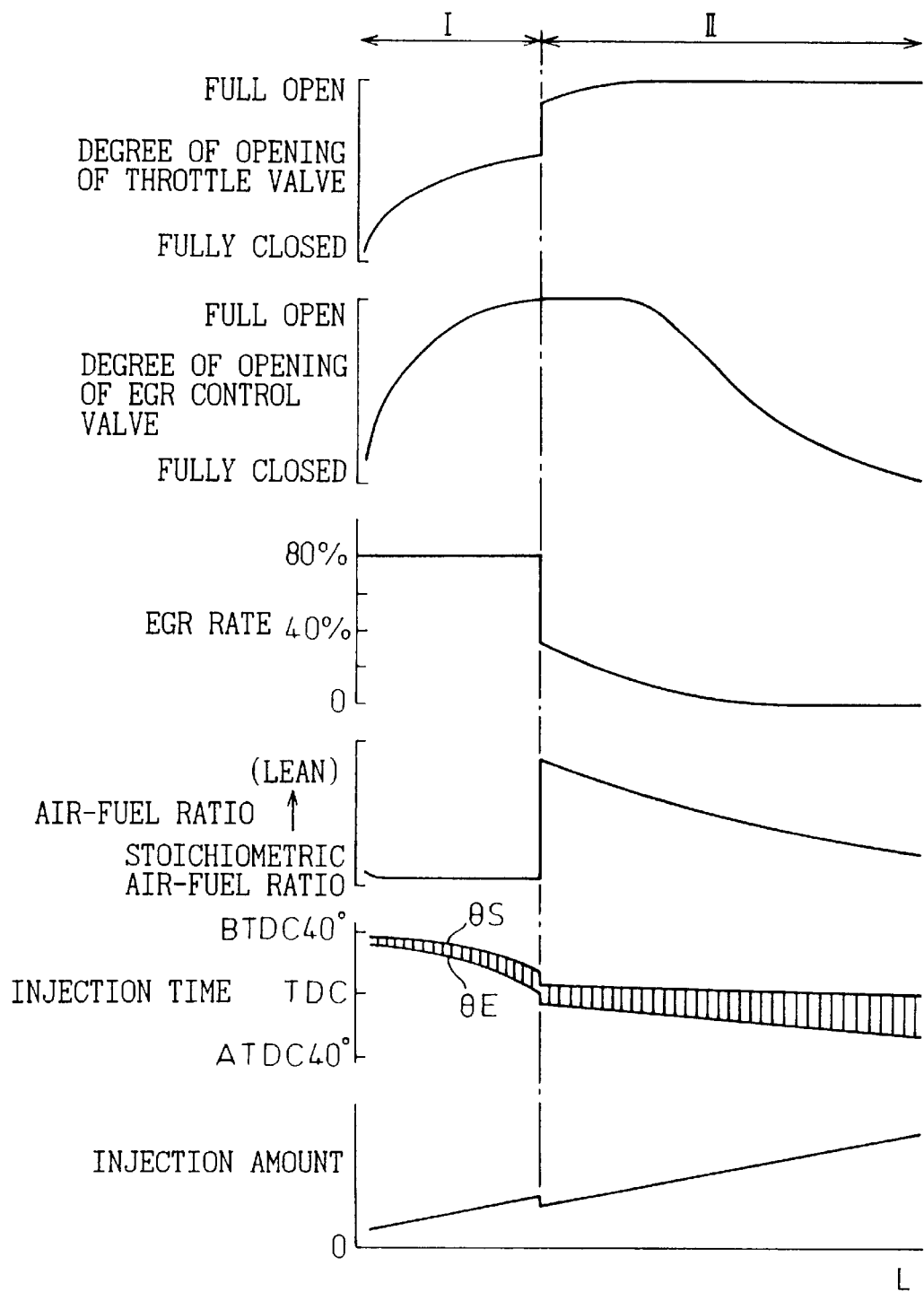
FIG. 11 is a view of the opening degree of a throttle valve etc.

FIG. 11 shows the opening degrees of the throttle valve 16, the opening degree of the EGR control valve 23, the EGR rate, the air-fuel ratio, the injection timing, and the amount of injection with respect to the required load L. As shown in FIG. 11, in the first operating region I with the low required load L, the opening degree of the throttle valve 16 is gradually increased from close to the fully closed state to the half opened state as the required load L becomes higher, while the opening degree of the EGR control valve 23 is gradually increased from close to the fully closed state to the fully opened state as the required load L becomes higher. Further, in the example shown in FIG. 11, in the first operating region I, the EGR rate is made about 70 percent and the air-fuel ratio is made a slightly lean air-fuel ratio.

In other words, in the first operating region I, the opening degree of the throttle valve 16 and the opening degree of the EGR control valve 23 are controlled so that the EGR rate becomes about 70 percent and the air-fuel ratio becomes a slightly lean air-fuel ratio. Note that at this time, the air-fuel ratio is controlled to the target lean air-fuel ratio by correcting the opening degree of the EGR control valve 23 based on the output signal of the air-fuel ratio sensor 21. Further, in the first operating region I, the fuel is injected before top dead center of the compression stroke TDC. In this case, the injection start timing θS becomes later the higher the required load L. The injection end timing θE also becomes later the later the injection start timing θS.

Note that, during idling operation, the throttle valve 16 is made to close to close to the fully closed state. At this time, the EGR control valve 23 is also made to close to close to the fully closed state. If the throttle valve 16 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 16 can be closed to close to the fully closed state to suppress vibration in the engine body 1.

When the engine is operating in the first operating region I, almost no soot or NOx is produced and hydrocarbons in the form of a soot precursor or its previous state contained in the exhaust gas can be oxidized by the catalyst 19.

On the other hand, if the engine operating state changes from the first operating region I to the second operating region II, the opening degree of the throttle valve 16 is increased in a step-like manner from the half opened state to the fully opened state. At this time, in the example shown in FIG. 11, the EGR rate is reduced in a step-like manner from about 70 percent to less than 40 percent and the air-fuel ratio is increased in a step-like manner. That is, since the EGR rate jumps over the range of EGR rates (FIG. 5) where a large amount of smoke is produced, there is no longer a large amount of smoke produced when the engine operating state changes from the first operating region I to the second operating region II.

In the second operating region II, the conventionally performed combustion is performed. In this combustion method, some soot and NOx are produced, but the heat efficiency is higher than with the low temperature combustion, so if the engine operating state changes from the first operating region I to the second operating region II, the amount of injection is reduced in a step-like manner as shown in FIG. 11.

In the second operating region II, the throttle valve 16 is held in the fully opened state except in portions and the opening degree of the EGR control valve 23 is gradually made smaller the higher the required load L. Therefore, in the operating region II, the EGR rate becomes lower the higher the required load L and the air-fuel ratio becomes smaller the higher the required load L. Even if the required load L becomes high, however, the air-fuel ratio is made a lean air-fuel ratio. Further, in the second operating region II, the injection start timing θS is made close to top dead center of the compression stroke TDC.

Figure 12:
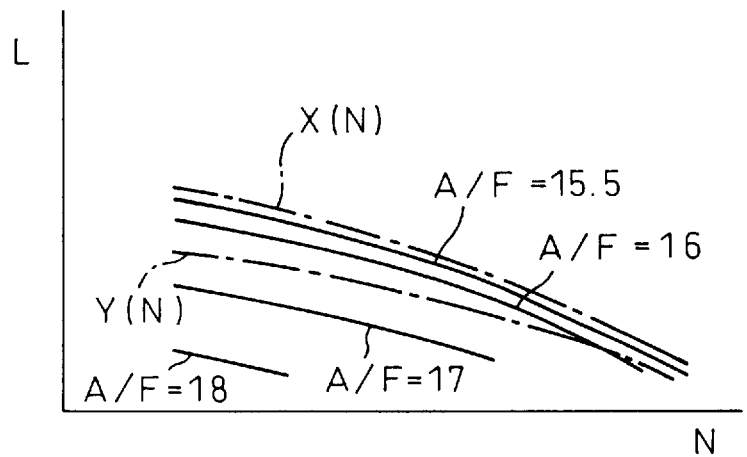
FIG. 12 is a view of the air-fuel ratio in a first operating region I.

FIG. 12 shows the air-fuel ratio A/F in the first operating region I. In FIG. 12, the curves shown by A/F=15.5, A/F=16, A/F=17, and A/F=18 show when the air-fuel ratio is 15.5, 16, 17, and 18. The air-fuel ratios between the curves are determined by proportional distribution. As shown in FIG. 12, in the first operating region, the air-fuel ratio becomes lean. Further, in the first operating region I, the air-fuel ratio A/F is made leaner the lower the required load L.

That is, the lower the required load L, the smaller the amount of heat generated by the combustion. Accordingly, the lower the required load L, the more low temperature combustion can be performed even if the EGR rate is lowered. If the EGR rate is lowered, the air-fuel ratio becomes larger. Therefore, as shown in FIG. 12, the air-fuel ratio A/F is made larger as the required load L becomes lower. The larger the air-fuel ratio A/F becomes, the more improved the fuel efficiency. Therefore to make the air-fuel ratio as lean as possible, in the embodiment according to the present invention, the air-fuel ratio A/F is made larger the lower the required load L becomes.

Figure 13A:
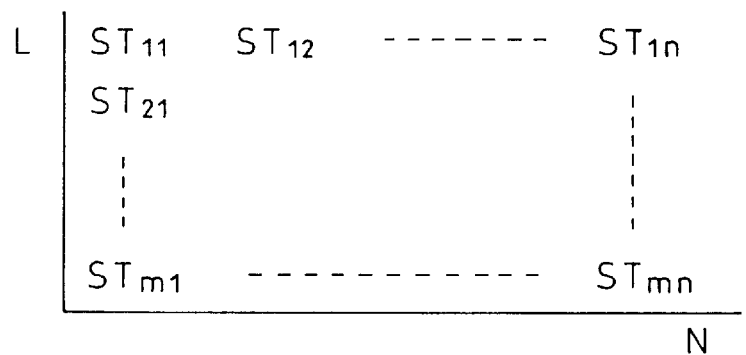
FIGS. 13A and 13B are views of maps of the target opening degree of a throttle valve etc.
Figure 13B:
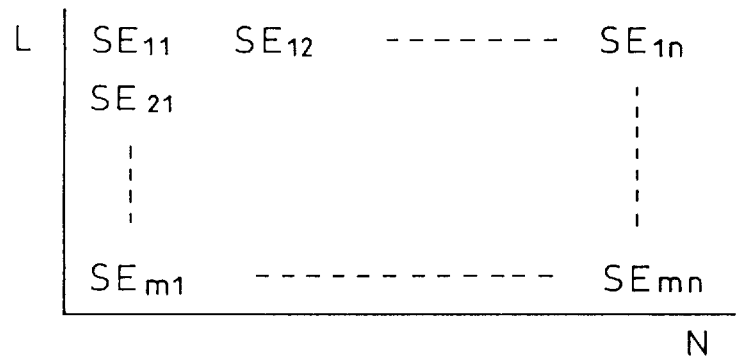

Note that the target opening degrees ST of the throttle valve 16 required for making the air-fuel ratio the target air-fuel ratios shown in FIG. 12 are stored in advance in the ROM 32 in the form of a map as a function of the required load L and the engine rotational speed N as shown in FIG. 13A. Further, the target opening degrees of the EGR control valve 23 required for making the air-fuel ratio the target air-fuel ratios shown in FIG. 12 are stored in advance in the ROM 32 in the form of a map as a function of the required load L and the engine rotational speed N as shown in FIG. 13B.

Figure 14:
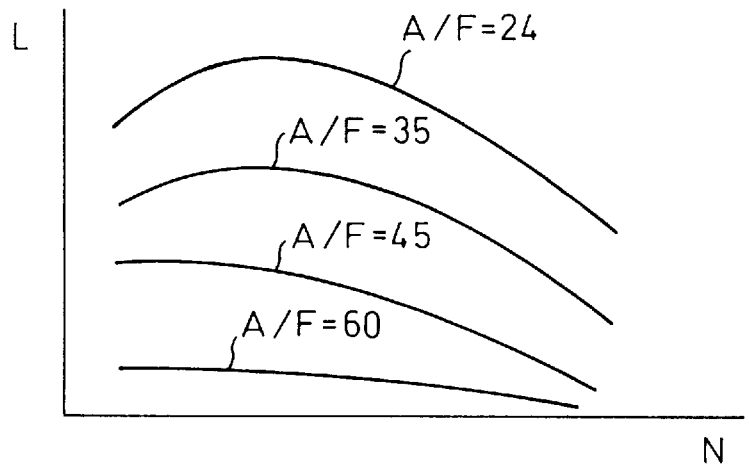
FIG. 14 is a view of an air-fuel ratio in a second combustion etc.
Figure 15A:
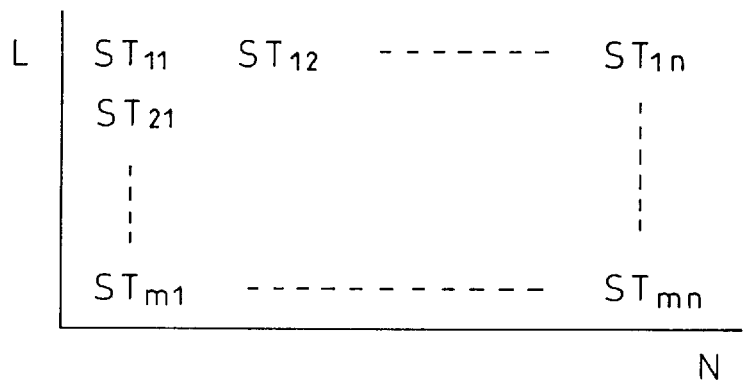
FIGS. 15A and 15B are views of a target opening degree of a throttle valve etc.
Figure 15B:
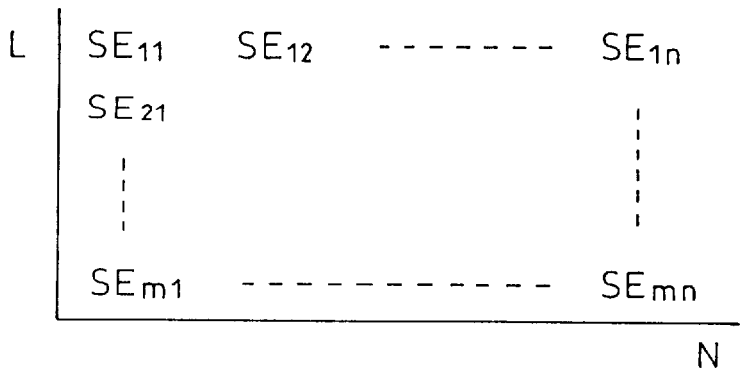

FIG. 14 shows the target air-fuel ratio at the time of second combustion, that is, normal combustion by the conventional combustion method. Note that in FIG. 14, the curves indicated by A/F=24, A/F=35, A/F=45, and A/F=60 respectively show the target air-fuel ratios 24, 35, 45, and 60. The target opening degrees ST of the throttle valve 16 required for making the air-fuel ratio these target air-fuel ratios are stored in advance in the ROM 32 in the form of a map as a function of the required load L and the engine rotational speed N as shown in FIG. 15A. The target opening degrees SE of the EGR control valve 23 required for making the air-fuel ratio these target air-fuel ratios are stored in advance in the ROM 32 in the form of a map as a function of the required load L and the engine rotational speed N as shown in FIG. 15B.

Figure 16:
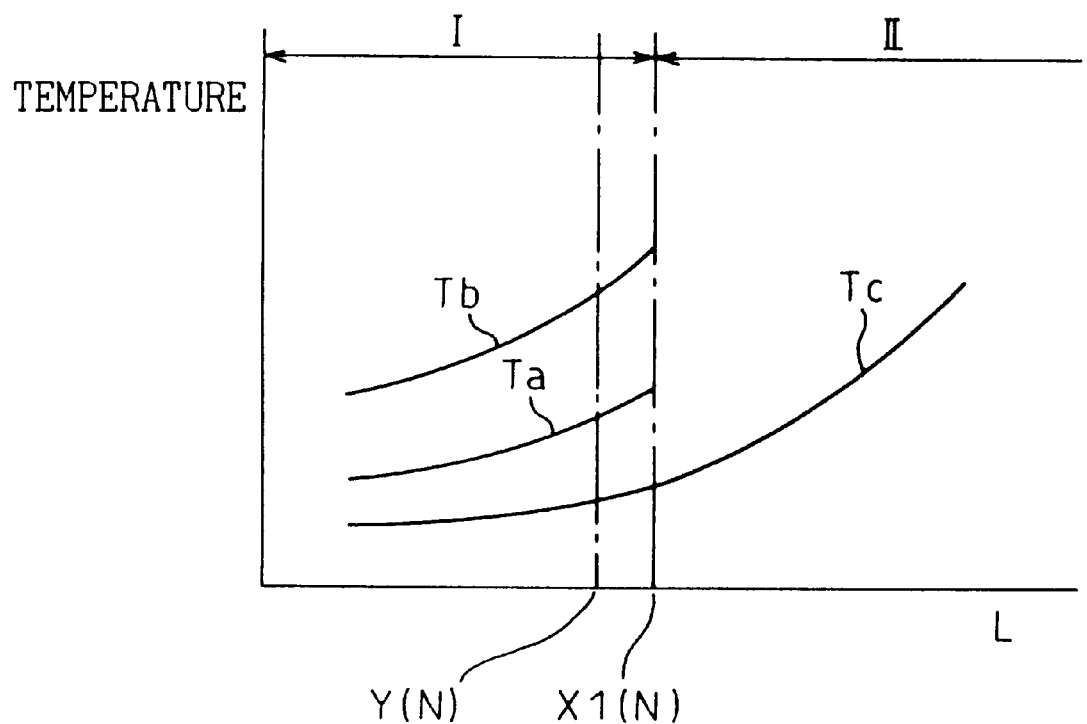
FIG. 16 is a view of a temperature Ta of exhaust gas flowing into a catalyst and temperatures Tb and Tc of the catalyst bed.

FIG. 16 shows the relationship between various temperatures and the required load L. In FIG. 16, Ta shows the temperature of the exhaust gas flowing into the catalyst 19 when the first combustion, that is, when low temperature combustion, is being performed in the first operating region I, while Tb shows the temperature of the catalyst bed of the catalyst 19 at that time. Further, Tc shows the temperature of the catalyst bed of the catalyst 19 when the second combustion is being performed in the first operating region I and second operating region II.

As explained above, when low temperature combustion is being performed, the temperature of the exhaust gas becomes higher than when the second combustion is being performed, therefore with the same required load L, the temperature Ta of the exhaust gas at the time of low temperature combustion becomes higher than the temperature Tc of the catalyst bed at the time of second combustion. Even when low temperature combustion is being performed, the higher the required load L, the larger the amount of heat generated at the time of combustion, so the higher the required load L, the higher the temperature Ta of the exhaust gas flowing into the catalyst 19. On the other hand, at the time of low temperature combustion, large amounts of unburned HC and CO are exhausted from the engine, so the temperature Tb of the catalyst bed of the catalyst 19 becomes considerably higher compared with the temperature Ta of the exhaust gas flowing into the catalyst 19 due to the heat of oxidation reaction of the unburned HC and CO.

In this embodiment of the present invention, as shown in FIG. 12 and FIG. 14, the air-fuel ratio is made lean both when first combustion is being performed and when second combustion is being performed. If combustion is continued under a lean air-fuel ratio in this way, however, as explained at the start, the precious metal carried in the catalyst 19 will be made to oxidize and as a result the activity of the catalyst 19 will decline. In this case, the activity of the catalyst 19 can be restored by making the temperature of the catalyst bed high and making the air-fuel ratio rich.

As shown in FIG. 16, however, when low temperature combustion is being performed, the temperature Tb of the catalyst bed becomes higher. Further, when low temperature combustion is being performed, no soot is generated even if the air-fuel ratio is made rich. Therefore, in the present invention, when low temperature combustion is being performed, the air-fuel ratio is made rich so as to restore the activity of the catalyst 19.

Note that as will be understood from FIG. 16, when low temperature combustion is being performed, the temperature Tb of the catalyst bed becomes higher the higher the required load L. In other words, the temperature Tb of the catalyst bed becomes highest immediately before the operating region of the engine changes from the first operating region I to the second operating region II and immediately after the operating region of the engine changes from the second operating region II to the first operating region I. Therefore, in the first embodiment of the present invention, the air-fuel ratio is made rich immediately before the operating region of the engine changes from the first operating region I to the second operating region II and immediately after the operating region of the engine changes from the second operating region II to the first operating region I.

Figure 17:
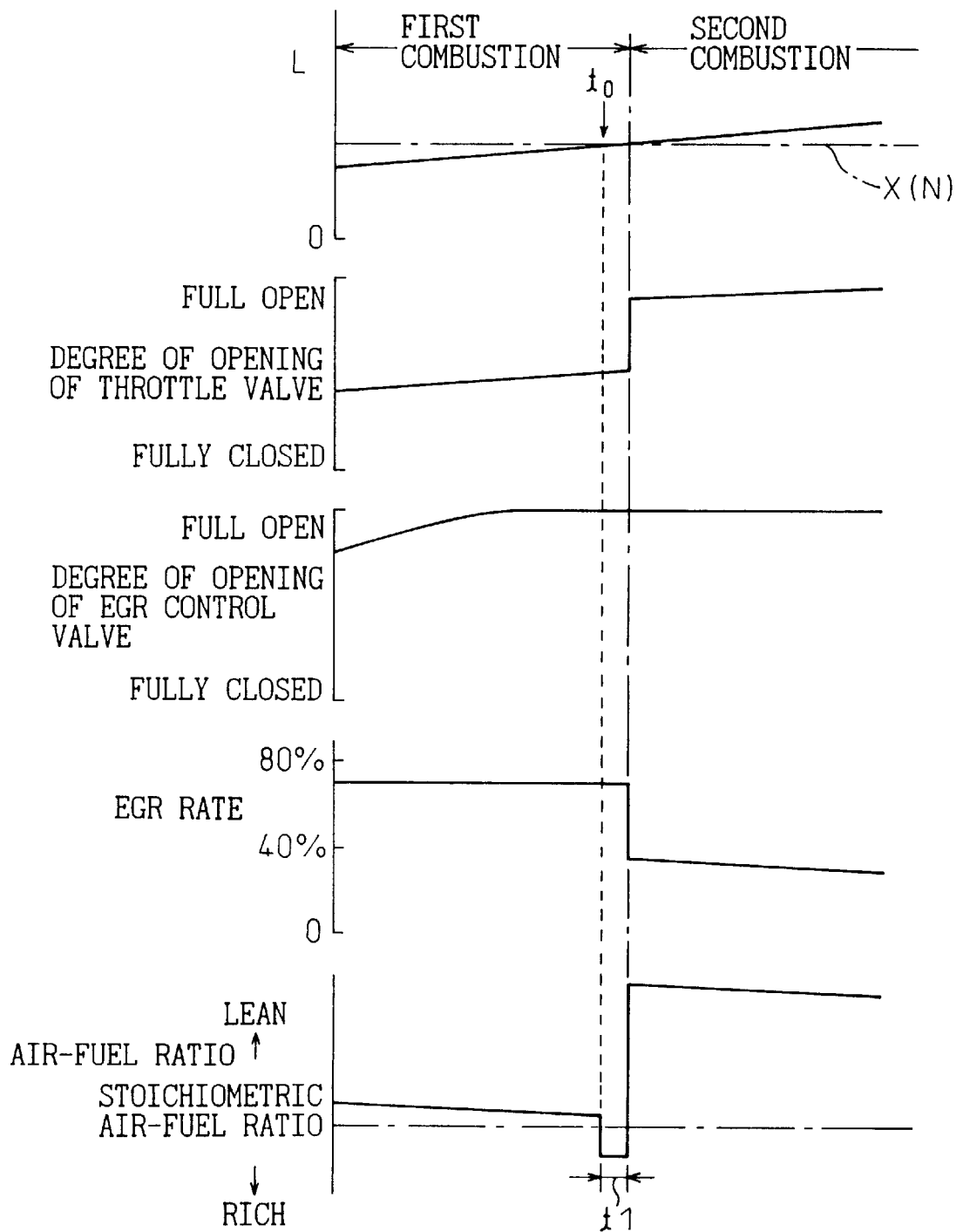
FIG. 17 is a time chart of the time for switching from low temperature combustion to second combustion.

This will be explained next more specifically with reference to FIG. 17 and FIG. 18. FIG. 17 shows the case where the required load L exceeds the first boundary X(N) at the time $t_0$. In the first embodiment, as shown in FIG. 17, even when the required load L exceeds the first boundary X(N), low temperature combustion continues to be performed and the air-fuel ratio is made rich for the time t1 under the low temperature combustion. Next, when the time t1 passes, the throttle valve 16 is made to open in a step-like manner and the second combustion is switched to.

Figure 18:
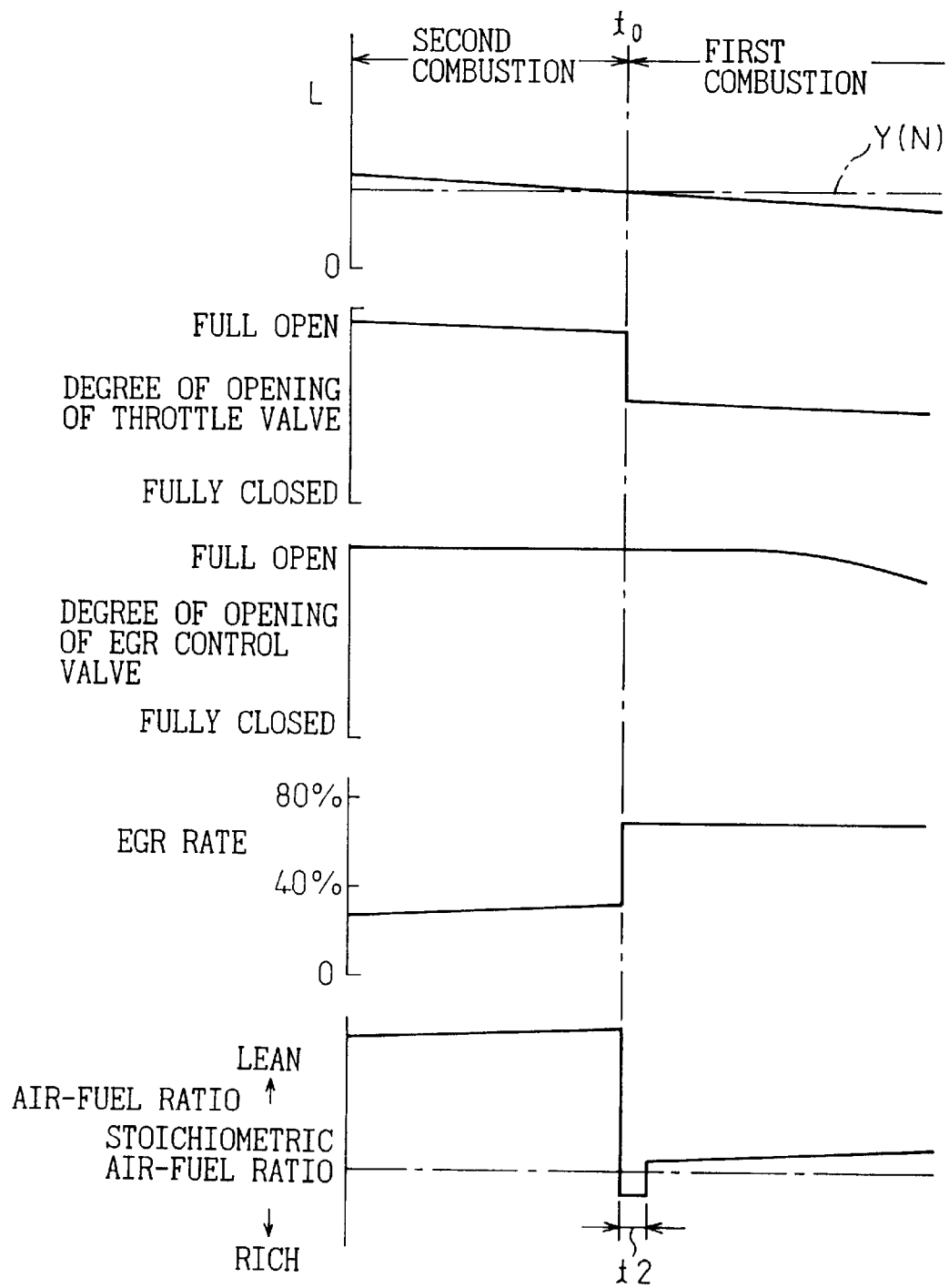
FIG. 18 is a time chart of the time for switching from second combustion to low temperature combustion.

On the other hand, FIG. 18 shows the case where the required load L has become lower than the second boundary Y(N). As shown in FIG. 18, when the required load L becomes lower than the second boundary Y(N) as well, the throttle valve 16 is made to close in a step-like manner and the second combustion is switched to the first combustion. When the second combustion is switched to the first combustion, the air-fuel ratio is made rich for the time t2.

Next, the control of the operation will be explained with reference to FIG. 19.

Figure 19:
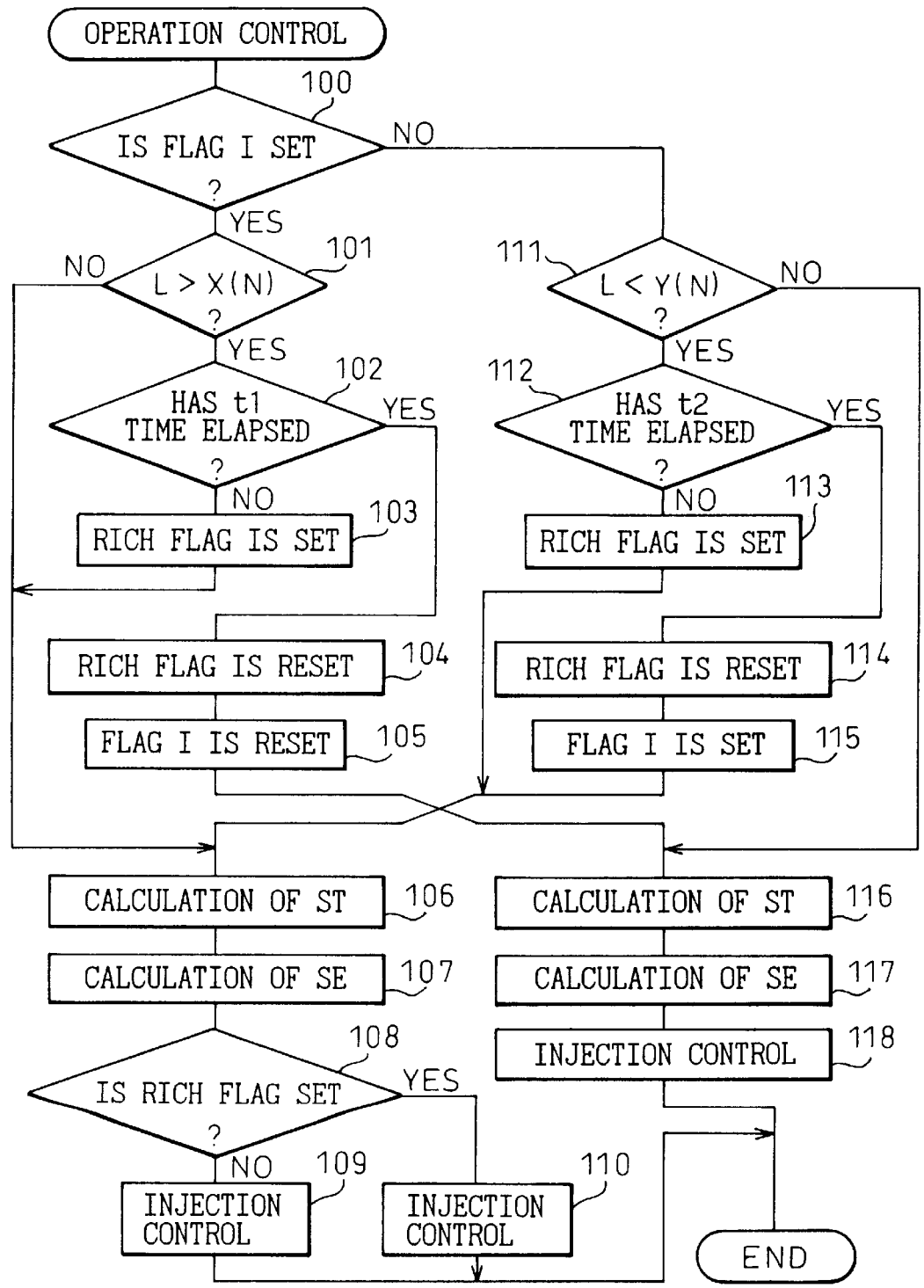
FIG. 19 is a flow chart of the control of engine operation.

Referring to FIG. 19, first, at step 100, it is judged if the flag I showing that the operating state of the engine is the first operating region I has been set or not. When the flag I has been set, that is, when the engine operating state is the first operating region I, the routine proceeds to step 101, where it is judged if the required load L has become larger than the first boundary X(N) or not. When L≦X(N), the routine proceeds to step 106, where low temperature combustion is performed.

That is, at step 106, the target opening degree ST of the throttle valve 16 is calculated from the map shown in FIG. 13A and the opening degree of the throttle valve 16 is made this target opening degree ST. Next, at step 107, the target opening degree SE of the EGR control valve 23 is calculated from the map shown in FIG. 13B and the opening degree of the EGR control valve 23 is made that target opening degree SE. Next, at step 108, it is judged if a rich flag set immediately before switching from the low temperature combustion to the second combustion has been set or not. When the rich flag has not been set, the routine proceeds to step 109, where the fuel is injected to give the lean air-fuel ratio shown in FIG. 12. The low temperature combustion is performed under this lean air-fuel ratio at this time.

On the other hand, when it is judged at step 101 that L>X(N), the routine proceeds to step 102, where it is judged if a time t1 has elapsed from when L became greater than X(N). When the time t1 has not elapsed, the routine proceeds to step 103, where the rich flag is set. When the rich flag is set, the routine proceeds through steps 106, 107, and 108 to step 110, where fuel is injected to give a rich air-fuel ratio. At this time, the low temperature combustion is performed under a rich air-fuel ratio.

When it is judged at step 102 that the time t1 has elapsed, the routine proceeds to step 104, where the rich flag is reset, then the routine proceeds to step 105, where the flag I is reset. Next, the routine proceeds to step 116, where second combustion is performed.

That is, at step 116, the target opening degree ST of the throttle valve 16 is calculated from the map shown in FIG. 15A and the opening degree of the throttle valve 16 is made the target opening degree ST. Next, at step 117, the target opening degree SE of the EGR control valve 23 is calculated from the map shown in FIG. 15B and the opening degree of the EGR control valve 23 is made that target opening degree SE. Next, at step 118, fuel is injected to give a lean air-fuel ratio shown in FIG. 14. The second combustion is performed under a lean air-fuel ratio at this time.

When the flag I is reset, at the next processing cycle, the routine proceeds from step 100 to step 111, where it is judged if the required load L has become smaller than the second boundary Y(N). When L≧Y(N), the routine proceeds to step 116, where the second combustion is performed under a lean air-fuel ratio.

On the other hand, when it is judged at step 111 that L<Y(N), the routine proceeds to step 112, where it is judged if the time t2 has elapsed from when L became smaller than Y(N). When the time t2 has not elapsed, the routine proceeds to step 113, where the rich flag is set. When the rich flag is set, the routine proceeds through steps 106, 107, and 108 to step 110, where fuel is injected to give a rich air-fuel ratio. The low temperature combustion is performed under the rich air-fuel ratio at this time.

When it is judged at step 112 that the time t2 has elapsed, the routine proceeds to step 114, where the rich flag is reset, then the routine proceeds to step 115, where the flag I is set. Next, the routine proceeds through steps 106, 107, and 108 to step 109, where the low temperature combustion is performed under a lean air-fuel ratio.

Next, a second embodiment will be explained with reference to FIG. 20.

Figure 20:
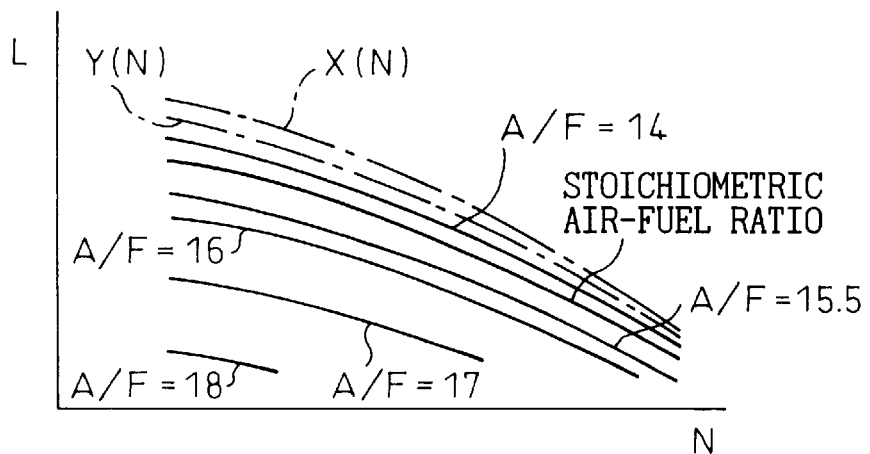
FIG. 20 is a view of the air-fuel ratio in the first operating region I.

FIG. 20 shows the air-fuel ratio A/F in the first operating region I. In FIG. 20, the curves shown by A/F=14, A/F=15.5, A/F=16, A/F=17, and A/F=18 show when the air-fuel ratio is 14, 15.5, 16, 17, and 18. The air-fuel ratios between the curves are determined by proportional distribution. As shown in FIG. 20, in the second embodiment, a curve showing the stoichiometric air-fuel ratio extends substantially at a position of a somewhat smaller required load L than the second boundary Y(N) an equal interval away from the second boundary Y(N). A rich region where the air-fuel ratio is rich extends in a band between the curve showing the stoichiometric air-fuel ratio and the first boundary X(N). In this rich region, the air-fuel ratio A/F becomes richer the higher the required load L.

Figure 21A:
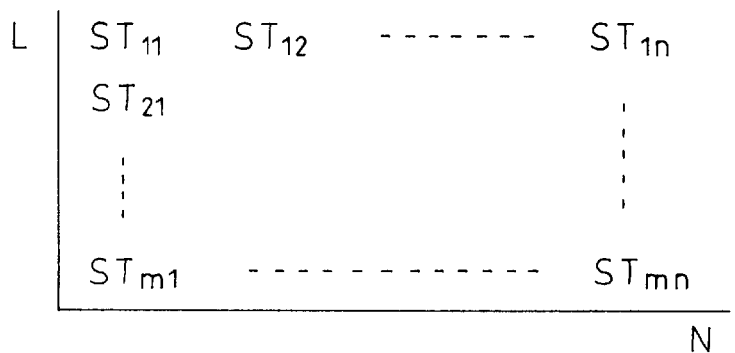
FIGS. 21A and 21B are views of maps of the target opening degree of the throttle valve etc.
Figure 21B:
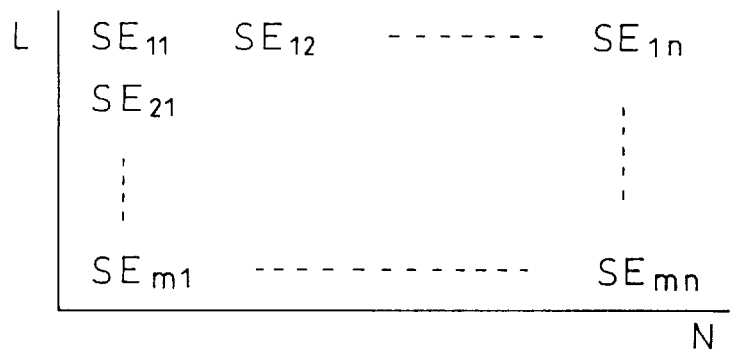

On the other hand, in the region of a required load L lower than the curve showing the stoichiometric air-fuel ratio, the air-fuel ratio becomes lean. Further, in this region, the air-fuel ratio A/F becomes leaner the lower the required load L. The target opening degree ST of the throttle valve 16 required for making the air-fuel ratio the target air-fuel ratio shown in FIG. 20 is stored in advance in the ROM 32 in the form of a map as a function of the required load L and the engine rotational speed N as shown in FIG. 21A, while the target opening degree SE of the EGR control valve 23 required for making the air-fuel ratio the target air-fuel ratio shown in FIG. 20 is stored in advance in the ROM 32 in the form of a map as a function of the required load L and the engine rotational speed N as shown in FIG. 21B.

Note that in the second embodiment as well, the air-fuel ratio at the time of the second combustion is made the lean air-fuel ratio shown in FIG. 14, therefore the target opening degree ST of the throttle valve 16 and the target opening degree SE of the EGR control valve 23 at the time of the second combustion are calculated from the maps shown in FIGS. 15A and 15B.

In the second embodiment, if the required load L becomes higher when low temperature combustion is being performed under a lean air-fuel ratio, the air-fuel ratio changes through a rich region air-fuel ratio to the lean air-fuel ratio of the time of second combustion. On the other hand, if the required load L becomes low when second combustion is being performed and low temperature combustion is shifted to, the air-fuel ratio changes from a rich region air-fuel ratio to a lean air-fuel ratio.

Next, the control of the operation will be explained with reference to FIG. 22.

Figure 22:
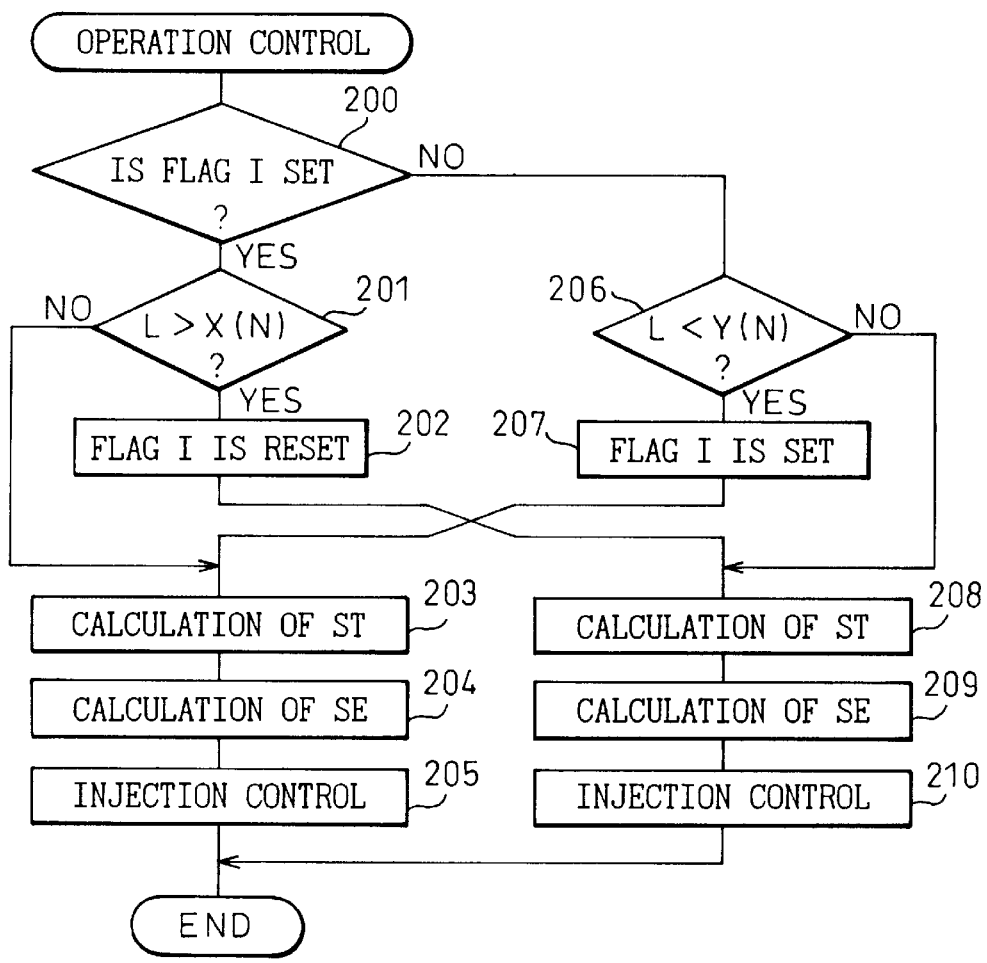
FIG. 22 is a flow chart of another embodiment for control of the engine operation.

Referring to FIG. 22, first, at step 200, it is judged if the flag I showing that the operating state of the engine is the first operating region I has been set or not. When the flag I has been set, that is, when the engine operating state is the first operating region I, the routine proceeds to step 201, where it is judged if the required load L has become larger than the first boundary X(N) or not. When L≦X(N), the routine proceeds to step 203, where low temperature combustion is performed.

That is, at step 203, the target opening degree ST of the throttle valve 16 is calculated from the map shown in FIG. 21A and the opening degree of the throttle valve 16 is made this target opening degree ST. Next, at step 204, the target opening degree SE of the EGR control valve 23 is calculated from the map shown in FIG. 21B and the opening degree of the EGR control valve 23 is made that target opening degree SE. Next, at step 205, fuel is injected to give the air-fuel ratio shown in FIG. 20. The low temperature combustion is performed at this time.

On the other hand, when it is judged at step 201 that L>X(N), the routine proceeds to step 202, where it is judged if the flag I has been reset, then the routine proceeds to step 208, where the second combustion is performed.

That is, at step 208, the target opening degree ST of the throttle valve 16 is calculated from the map shown in FIG. 15A and the opening degree of the throttle valve 16 is made the target opening degree ST. Next, at step 209, the target opening degree SE of the EGR control valve 23 is calculated from the map shown in FIG. 15B and the opening degree of the EGR control valve 23 is made that target opening degree SE. Next, at step 210, fuel is injected to give a lean air-fuel ratio shown in FIG. 14.

When the flag I is reset, at the next processing cycle, the routine proceeds from step 200 to step 206, where it is judged if the required load L has become smaller than the second boundary Y(N). When L≧Y(N), the routine proceeds to step 208, where the second combustion is performed under a lean air-fuel ratio.

On the other hand, when it is judged at step 206 that L<Y(N), the routine proceeds to step 207, where the flag I is set, then the routine proceeds to step 203, where the low temperature combustion is performed.

Figure 23:
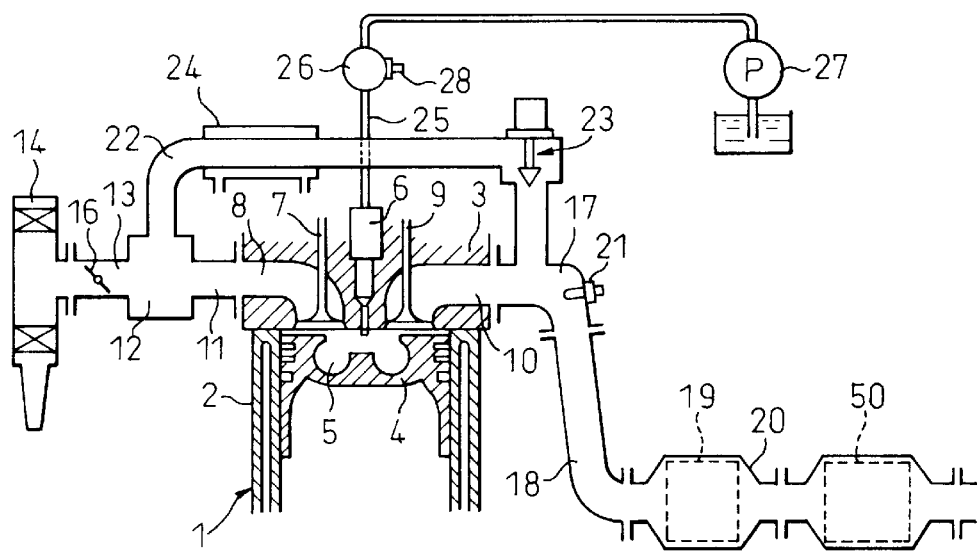
FIG. 23 is an overview of another embodiment of a compression ignition type engine.

FIG. 23 shows another embodiment. In this embodiment, another catalyst 50 having an oxidation action is arranged downstream of the catalyst 19 having the oxidation action. As this catalyst 50, it is possible to also use an oxidation catalyst, three-way catalyst, or NOx absorbent.

Next, an explanation will be made of the case of use of an NOx absorbent as the catalyst 19 or catalyst 50.

As explained above, the NOx absorbents 19 and 50 have a NOx absorbing and releasing action by which they absorb NOx when the air-fuel ratio is lean and release the absorbed NOx when the air-fuel ratio becomes the stoichiometric air-fuel ratio or rich.

If arranging the NOx absorbents 19 and 50 in the engine exhaust passage, the NOx absorbents 19 and 50 actually perform this NOx absorbing and releasing action, but there are parts of the detailed mechanism for this absorbing and releasing action which are not clear. This absorbing and releasing action however is believed to be due to the mechanism shown in FIGS. 24A and 24B. This mechanism will be explained next taking as an example the case of carrying platinum Pt and barium Ba on a carrier, but the same mechanism acts even if using another precious metal, alkali metal, alkali earth, or rare earth.

Figure 24A:
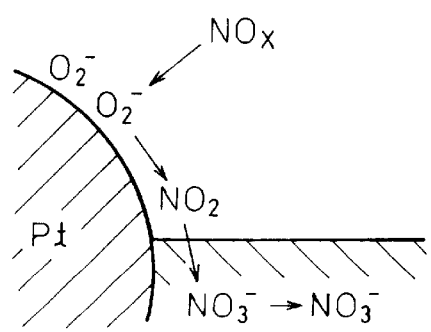
FIGS. 24A and 24B are views for explaining the NOx absorption and release action.

In this embodiment of the present invention, combustion is normally performed with a lean air-fuel ratio. When performing combustion with a lean air-fuel ratio in this way, the oxygen concentration in the exhaust gas is high. At this time, as shown in FIG. 24A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is oxidized on the platinum Pt, absorbed in the absorbent, bonds with the barium oxide BaO, and is diffused inside the absorbent in the form of the nitrate ions $NO_3^-$ as shown in FIG. 24A. In this way, the NOx is absorbed in the NOx absorbents 19 and 50. So long as the oxygen concentration in the inflowing exhaust gas is high, $NO_2$ is produced on the surface of the platinum Pt. So long as the NOx absorption capacity of the absorbent is not saturated, the $NO_2$ is absorbed in the absorbent and nitrate ions $NO_3^-$ are produced.

Figure 24B:
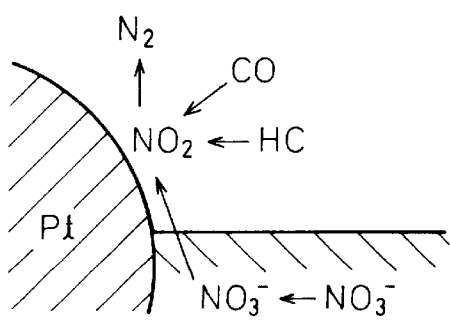

As opposed to this, in this embodiment of the present invention, the air-fuel ratio is made rich immediately before switching from the first combustion to the second combustion and immediately after switching from the second combustion to the first combustion. If the air-fuel ratio is made rich, the oxygen concentration in the exhaust gas falls, and the amount of production of $NO_2$ falls, the reaction proceeds in the reverse direction ($NO_3^- \rightarrow NO_2$) and the nitrate ions $NO_3^-$ in the absorbent are released from the absorbent in the form of $NO_2$. The NOx released from the NOx absorbents 19 and 50 at this time is reduced by the large amounts of unburnt HC and CO contained in the exhaust gas as shown by FIG. 24B. In this way, when there is no longer $NO_2$ on the surface of the platinum Pt, $NO_2$ is successively released from the absorbents. Therefore, if the air-fuel ratio is made rich, the NOx is released from the NOx absorbents 19 and 50 in a short period and the released NOx is reduced, so it becomes possible to prevent the NOx from being released into the atmosphere.

In this way, when an NOx absorbent is used as the catalyst 19 or catalyst 50, the release of NOx into the atmosphere is prevented. Further, almost no soot is produced even if the air-fuel ratio is made rich at the time of low temperature combustion and NOx is released from the NOx absorbent.

According to the present invention, as explained above, it is possible to prevent a decline in the activity of a catalyst carrying a precious metal.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of inert gas supplied in a combustion chamber increases and in which a further increase of the amount of inert gas supplied in the combustion chamber results in a temperature of fuel and surrounding gas in the combustion chamber becoming lower than a temperature of production of soot and therefore almost no production of soot any longer, said engine comprising:

a catalyst arranged in an engine exhaust passage and carrying a precious metal;

switching means for selectively switching between a first combustion where the amount of the inert gas supplied to the combustion chamber is larger than the amount of inert gas where the amount of production of soot peaks and almost no soot is produced and a second combustion where the amount of inert gas supplied to the combustion chamber is smaller than the amount of inert gas where the amount of production of soot peaks; and air-fuel ratio control means for making an air-fuel ratio at least temporarily rich under the first combustion when switching from the first combustion to second combustion or switching from the second combustion to the first combustion.

2. A compression ignition type engine as set forth in claim 1, wherein: an engine operating region is divided into a low load side region where the first combustion is performed under a lean air-fuel ratio, a high load side region where the second combustion is performed under a lean air-fuel ratio, and a region between said low load side region and high load side region where the first combustion is performed under a rich air-fuel ratio, and the first combustion is performed under a rich air-fuel ratio when the engine operating state is switched from the low load side region to the high load side region or when the engine operating state is switched from the high load side region to the low load side region.

3. A compression ignition type engine as set forth in claim 1, wherein the catalyst is comprised of at least one of an oxidation catalyst and a three-way catalyst.

4. A compression ignition type engine as set forth in claim 1, wherein the catalyst is comprised of a NOx absorbent which absorbs NOx contained in an exhaust gas when an air-fuel ratio of exhaust gas flowing into the NOx absorbent is lean and releases the absorbed NOx when the air-fuel ratio of exhaust gas flowing into the NOx absorbent is the stoichiometric air-fuel ratio or rich.

5. A compression ignition type engine as set forth in claim 1, wherein the first combustion and the second combustion are normally performed under a lean air-fuel ratio and wherein said air-fuel ratio control means makes the air-fuel ratio under the first combustion temporarily rich when switching from the first combustion to the second combustion or when switching from the second combustion to the first combustion.

6. A compression ignition type engine as set forth in claim 5, wherein: an engine operating region is divided into a low load side first operating region where the first combustion is performed and a high load side second operating region where the second combustion is performed, and said air-fuel ratio control means makes the air-fuel ratio under the first combustion temporarily rich when the engine operating state is switched from the first operating region to the second operating region or when the engine operating state is switched from the second operating region to the first operating region.

7. A compression ignition type engine as set forth in claim 1, wherein an exhaust gas recirculation apparatus is provided for recirculating exhaust gas exhausted from a combustion chamber into an engine intake passage and wherein the inert gas is comprised of recirculated exhaust gas.

8. A compression ignition type engine as set forth in claim 7, wherein an exhaust gas recirculation rate when the first combustion is being performed is more than about 55 percent and the exhaust gas recirculation rate when the second combustion is being performed is less than about 50 percent.

* * * * *